(12) United States Patent
Xiao et al.

(10) Patent No.: US 7,760,621 B2
(45) Date of Patent: Jul. 20, 2010

(54) METHOD AND SYSTEM FOR PROTECTING LABEL SWITCHED PATH

(75) Inventors: Qingsong Xiao, Shenzhen (CN); Bing Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 385 days.

(21) Appl. No.: 11/853,180

(22) Filed: Sep. 11, 2007

(65) Prior Publication Data
US 2008/0062882 A1 Mar. 13, 2008

(30) Foreign Application Priority Data
Sep. 13, 2006 (CN) .................. 2006 1 0153597

(51) Int. Cl.
*G01R 31/08* (2006.01)
(52) U.S. Cl. .................................................. 370/217
(58) Field of Classification Search .............. 370/217
See application file for complete search history.

(56) References Cited
U.S. PATENT DOCUMENTS
2003/0210705 A1 11/2003 Seddigh et al.
2005/0281192 A1* 12/2005 Nadeau et al. ............ 370/217
2006/0018255 A1 1/2006 Tankhiwale
2006/0159009 A1* 7/2006 Kim et al. ................ 370/216

FOREIGN PATENT DOCUMENTS
CN 1618025 5/2005

OTHER PUBLICATIONS
"MPLS-TE(2) The System Design of MPLS Traffic Engineering (2);" Guan Gdong Communication Technology, vol. 23, No. 7, Jul. 2003.

* cited by examiner

*Primary Examiner*—Derrick W Ferris
*Assistant Examiner*—Mohammad Anwar

(57) ABSTRACT

A method for protecting a label switched path is disclosed. The method includes: setting, in a record_route object node list, interface classification identifications in record_route objects corresponding to interfaces of resource reservation protocol nodes respectively, and delivering the list downstream; when a downstream resource reservation protocol node receives the record_route object node list from upstream, finding, by the downstream resource reservation protocol node, a record_route object node corresponding to a last outgoing interface of a nearest outgoing interface in the record_route object node list according to the interface classification identifications, and setting next next hop protection for a corresponding label switched path according to a protection identification of the record-route object node. A system and device for protecting a label switched path are also disclosed. With the invention, an RSVP node may implement NNHOP protection for an upstream LSP correctly.

11 Claims, 2 Drawing Sheets

METHOD AND SYSTEM FOR PROTECTING LABEL SWITCHED PATH

The application claims the priority of Chinese patent application No. 200610153597.9 submitted with the State Intellectual Property Office of P.R.C. on Sep. 13, 2006, entitled "Method and System for Protecting Label Switched Path", the content of which is incorporated herein in entirety by reference.

FIELD OF THE INVENTION

The invention relates to the field of communication and information technology, and in particular to label switched path protection

BACKGROUND OF THE INVENTION

After the development of more than 30 years, the Ethernet technique based on Transmission Control Protocol/Internet Protocol (TCP/IP) has become a dominant local area network technique. The Ethernet technique has find applications successfully in core networks of public networks, as well as metropolitan area networks, and has penetrated into public access networks gradually. The Ethernet technique has become a de facto transport protocol standard for almost every application. Due to its simplicity, flexibility and low lost, it has gained significant advantages over some traditional techniques, such as token ring, Fiber Distributed Data Interface (FDDI) and Asynchronous Transfer Mode (ATM).

With the development of Ethernet-based Local Area Networks (LAN) and Ethernet switching technique, IP network is expected to provide services, such as end to end forwarding control, etc., in addition to the traditional services, such as email, network surfing, etc. Multi-Protocol Label Switching (MPLS) is a technique for forwarding acceleration based on a label between link layer header and network layer header, which is recently developed on the basis of IP techniques in combination with ATM techniques. MPLS is compatible with a variety of network techniques and link layer techniques, and has find broad application in the fields of Virtual Private Networking (VPN), traffic engineering, Quality of Service (QoS), etc.

Downstream Label Switch Router (LSR) is a basic component unit of an MPLS network. A network constituted by LSRs is referred to as an MPLS domain. An LSR which is located at the edge of the MPLS domain and connected with other user networks is referred to as an edge LSR, and an LSR located inside the MPLS domain is referred to as a core LSR. The core LSR may be an MPLS-supporting router, or may be an ATM-LSR upgraded from an ATM exchange or the like. A labeled packet is transmitted along a Label Switched Path (LSP) consisting of a series of LSRs. The entry LSR is called "Ingress", and the exit LSR is called "Egress". For example, a path consisting of the connected LSR devices 2, 3, 4, and 5 is an LSP. The ingress of the LSP is the LSR device 2, and the egress of the LSP is the LSR device 5.

MPLS may achieve various traffic engineering functions, which may be implemented by other models, with a relative low cost, and may achieve partial automation of the traffic engineering functions. At present, resource Reservation Protocol (RSVP)-Traffic Engineering (TE) is generally employed to support MPLS TE. The RSVP-TE is an extension to traffic engineering based on RSVP. In the RSVP-TE, the messages are mainly classified into two types, i.e., PATH and RESV, which are extensions to the corresponding messages in RSVP. RSVP-TE may provide MPLS TE with configurable explicit path and bandwidth-reservable LSP, and may support the Fast Re-route (FRR), preemption and loop detection of LSP.

In RSVP, an RSVP message has a specialized object called Record_Route Object (RRO) during transmission. The RRO object records the information of the path through which the RSVP message passes. Each time the RSVP message passes through an RSVP node, the RRO carried in the RSVP message is stored into the RSVP node currently passed by the RSVP message (i.e., the local node), and the information of the local node is inserted into the RRO in the form of RRO sub-object, then the updated RRO is carried by the RSVP message to the next hop. The information of the local node includes the address of a message incoming interface of the node, NODE-ID (node identification) of the node, the address of a message outgoing interface of the node, as well of the label and the local protection of the node. In this way, the RSVP message may be aware of the overall situation of the whole LSP when passing through each hop of the LSP. This facilitates the queries of users. In addition, RRO is also used to provide information about path comparison in the FRR of the LSP, and is used by upstream to examine the downstream protection condition.

To implement FRR function over MPLS is to enable network services to be detoured to or switched to a new LSP in the event of a failure on a node or link of an LSP, so as to ensure the network services uninterrupted. To this end, FRR establishes a local protection backup LSP for an LSP, so that the LSP is temporarily replaced by the backup LSP locally when a failure occurs on the local node/link. In the prior art, FRR may establishes two types of backup LSPs, i.e., Next Hop (NHOP) backup LSP and Next Next Hop (NNHOP) backup LSP. An NHOP backup LSP protects a single link of the main LSP between two nodes by a backup link defined between the two nodes. An NNHOP backup LSP protects an intermediate node between two nodes by a backup node defined between the two nodes and by a backup link between the backup node and the two nodes. The method of NNHOP backup LSP is mainly used to protect single node on the main LSP. For example, suppose there are 3 nodes A, B, and C on a main LSP, for the protection of node B, a node D is defined between the node A and node C. The nodes A, D, and C form a backup link, i.e., an NNHOP backup LSP. When a failure occurs on the node B, an RSVP message may bypass the failed node B, and be detoured to the backup link for transmission.

In the prior art, a backup LSP, when established, needs to be bound with the main LSP to be protected so as to establish a protection relationship. When the binding is successful, a "Local protection available" flag is set at an RRO node corresponding to an outgoing interface of a forked node of the protected LSP and the backup LSP, i.e., a Point of Local Repair (PLR). Then a "path" message carries the information of the RRO node to downstream nodes of the PLR. When receiving the "path" message, each downstream node checks whether a "Local protection available" flag at a nearest upstream RRO node is set. If the "Local protection available" flag at the nearest upstream RRO node is set, the downstream node is considered to be a Merge Point (MP) of the main LSP and the backup LSP, and the corresponding LSP state block is set as a protected state. At the MP node, if a failure occurring on the protected LSP is sensed, the corresponding state on the MP is not immediately deleted until the temporarily switching of FRR, so that the LSP is not interrupted.

In actual applications of the above technical solution, when the backup LSP is an NNHOP backup LSP, the MP of the backup LSP can not be identified uniquely in the prior art. Accordingly, the main LSP can not be protected by the NNHOP backup LSP.

The reason mainly lies in that, a downstream RSVP node determines whether the downstream RSVP node is an MP by checking whether the "Local protection available" flag of the nearest upstream RRO node is set. When the backup LSP is an NHOP backup LSP, the nearest upstream RRO node is the RRO node corresponding to the outgoing interface of the PLR. Whether the local node is an MP of the NHOP may be determined uniquely by judging whether the "Local protection available" flag of the nearest upstream RRO node is set. However, if the backup LSP is an NNHOP backup LSP, there is a protected RSVP node between the PLR and the MP, the protected RSVP node may have different number of RRO nodes depending on its manufacturers. In this case, for a downstream node of the PLR, the nearest one or two upstream RRO nodes are not necessarily the nodes corresponding to the outgoing node of the PLR. Thus, whether the local node is an MP of the NNHOP can not be determined by simply checking the "Local protection available" flags of the nearest one or more upstream RRO nodes. Consequently, the state of corresponding LSP state block can not be set. The corresponding backup LSP can not be utilized correctly when a failure occurs on the protected node.

SUMMARY OF THE INVENTION

The invention provides a method, device and system for protecting Label Switched Path (LSP), so that an RSVP node may achieve a correct NNHOP protection for an upstream LSP.

The invention provides a method for protecting label switched path. The method includes:

setting, in a record_route object node list, interface classification identifications in record_route object corresponding to interfaces of resource reservation protocol nodes respectively, and delivering the record_route object node list downstream;

when a downstream resource reservation protocol node receives the record_route object node list from upstream, finding, by the downstream resource reservation protocol node, a record_route object node corresponding to a last outgoing interface of a nearest upstream outgoing interface in the record_route object node list according to the interface classification identifications, and setting next next hop protection for a corresponding label switched path according to a protection identification of the record-route object node corresponding to the last outgoing interface of the nearest upstream outgoing interface.

The invention further provides a resource reservation protocol node device. The node device includes:

an interface information configuration module, adapted for setting interface classification identifications of record_route object nodes corresponding to interfaces of a local resource reservation protocol node in a record_route object node list to be delivered downstream;

a look-up module, adapted for finding, when receiving a record_route object node list from upstream, a record_route object node corresponding to a last outgoing interface of a nearest outgoing interface in the record_route object node list according to interface classification identifications;

a first protection implementation module, adapted for setting next next hop protection for a corresponding label switched path according to a protection identification of the record_route object node corresponding to the last outgoing interface of the nearest outgoing interface found by the look-up module.

The invention provides a system for protecting label switched path. The system includes at least three resource reservation protocol nodes. Each resource reservation protocol node includes:

an interface information configuration module, adapted for setting interface classification identifications of record_route object nodes corresponding to interfaces of a local resource reservation protocol node in a record_route object node list to be delivered downstream;

a look-up module, adapted for finding, when receiving a record_route object node list from upstream, a record_route object node corresponding to a last outgoing interface of a nearest outgoing interface in the record_route object node list according to interface classification identifications;

a first protection implementation module, adapted for setting next next hop protection for a corresponding label switched path according to a protection identification of the record_route object node corresponding to the last outgoing interface of the nearest outgoing interface found by the look-up module.

In the technical solutions of the invention, compared with the prior art, in an RRO node list delivered downstream, upstream RSVP nodes set interface classification identifications in the RRO nodes corresponding to the interfaces of the upstream RSVP nodes. When receiving the RRO node list from upstream, each downstream RSVP node finds the second nearest upstream RRO node corresponding to its outgoing interface according to the interface classification identifications, and configures NNHOP protection for a corresponding LSP according to the protection identification of the second nearest upstream RRO node. In this way, an LSP will not be deleted immediately when a failure occurs on an interface or node, and the NNHOP protection of upstream LSP may be detected.

DETAILED DESCRIPTION OF THE EMBODIMENTS

The invention will be further described in detail in conjunction with the figures, in order to make the object, the technical solutions and advantages of the invention clearer.

For one embodiment in an RRO node list delivered downstream, upstream RSVP nodes set interface classification identifications in the RRO nodes corresponding to the interfaces of the upstream RSVP nodes. The interface classification identification is record in an RRO node list and the RRO node list is delivered downstream. When receiving the RRO node list from upstream, each downstream RSVP node finds the second nearest upstream RRO node corresponding to its outgoing interface according to the interface classification identifications, and configures NNHOP protection for a corresponding LSP according to the protection identification of the second nearest upstream RRO node.

In the first embodiment, network pre-establishes a backup LSP for an RSVP node or LSP to be protected, binds the backup LSP with the main LSP to be protected. and sets the protection identification of an RRO node, corresponding to an outgoing interface of a Point of Local Repair (PLR) of the main LSP to be protected and the backup LSP, as a protection state. The information of the RRO node is transmitted to the nodes downstream of the PLR, together with the RRO node list. The RRO node list transmitted downstream includes information about RRO nodes corresponding to the interfaces of the upstream RSVP nodes, such as interface classification identifications for identifying whether the RRO nodes correspond to incoming interfaces, node identifications of the RSVP nodes, etc. When receiving the RRO node list, each downstream RSVP node finds the second nearest upstream RRO node corresponding to an outgoing interface of the each downstream RSVP node in the upstream direction from the end of the RRO node list based on the interface classification identifications of the RRO nodes contained in the RRO node list, and sets NNHOP protection for a corresponding LSP according to the protection identification of the second nearest upstream RRO node.

Figure 1:
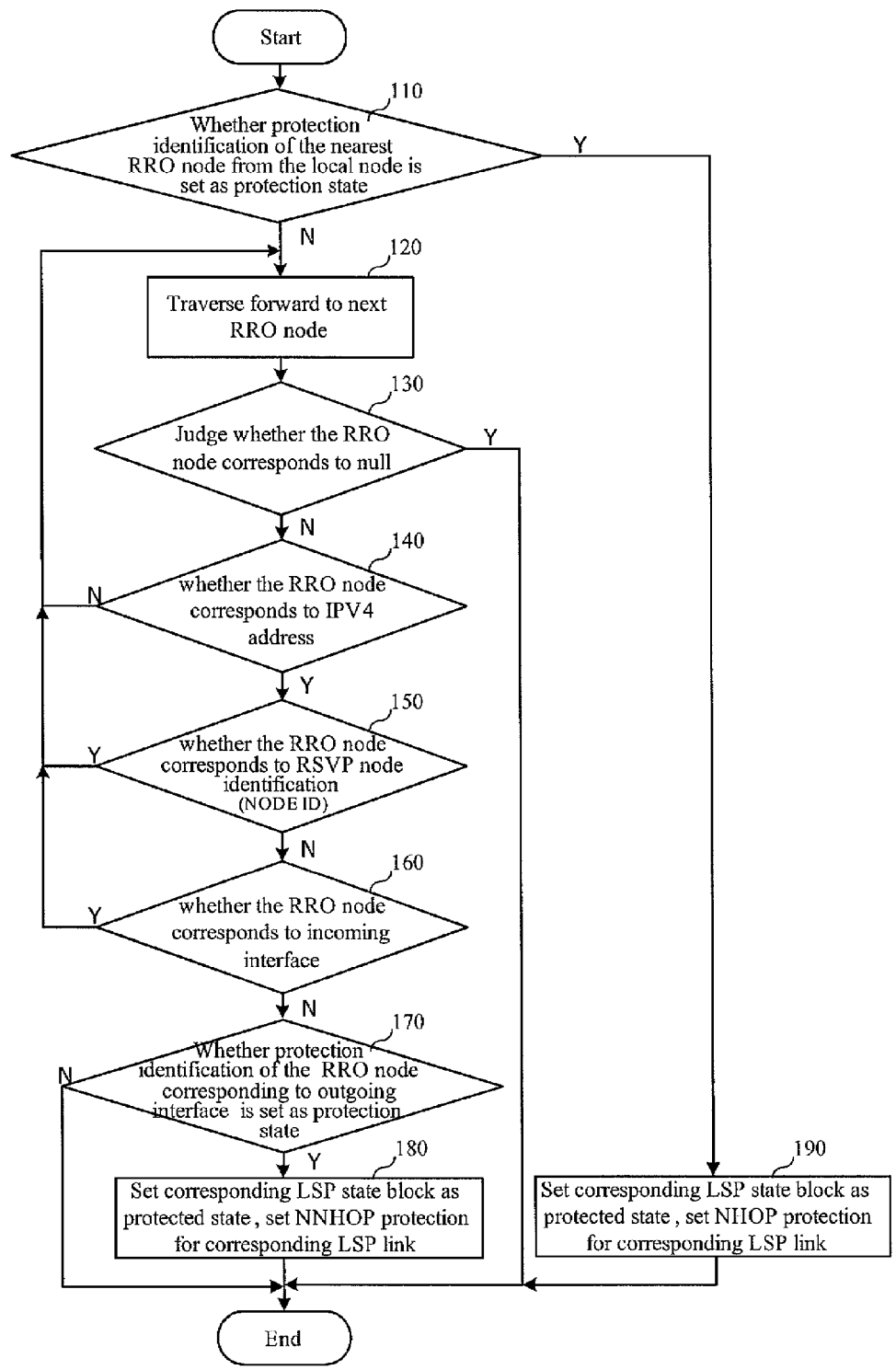
FIG. 1 is a flow chart showing a method for protecting an LSP according to a first embodiment of the invention.

As shown in FIG. 1, the process of the method for LSP protection is as follows.

In step 110, it is judged whether the protection identification of the nearest outgoing interface from the local RSVP node is set as a protection state.

When receiving an RRO node list from upstream, a downstream RSVP node checks the nearest RRO node from the downstream RSVP node (the nearest RRO node from the downstream RSVP node is an RRO node corresponding to the nearest outgoing interface from the downstream RSVP node) according to the order of RRO nodes contained in the RRO node list, judges whether the protection identification of the RRO node is set as a protection state. If the protection identification of the RRO node is not set as a protection state, the process proceeds to step 120. If the protection identification of the RRO node is set as a protection state, it means there is a backup LSP link for the LSP link between the downstream RSVP node and the last upstream RSVP, and the process proceeds to step 190.

In step 120, the downstream ESVP node continues to traverse to a next RRO node.

In step 130, it is judged whether this next RRO node is null. If this next RRO node is null, the process is terminated, otherwise, the process proceeds to step 140.

Next, it is judged whether this next RRO node corresponds to the second nearest outgoing interface from the downstream RSVP node.

In step 140, the downstream ESVP node firstly judges whether this next RRO node corresponds to an IPV4 address. If this next RRO node corresponds to an IPV4 address, the process proceeds to step 150, otherwise, it means that this next RRO node is impossible to correspond to the outgoing interface, the process returns to step 120, the downstream ESVP node continues to traverse to another next RRO node.

In step 150, the downstream ESVP node judges whether this next RRO node corresponds to an RSVP node identification (NODE ID). If this next RRO node corresponds to an RSVP node identification (NODE ID), this next RRO node is impossible to correspond to the outgoing interface, the process returns to step 120, the downstream ESVP node continues to traverse to another next RRO node; otherwise, if this next RRO node is not an RSVP node, the process proceeds to step 160.

In step 160, the downstream RSVP node judges whether this next RRO node corresponds to an incoming interface according to interface classification identifications. If this next RRO node corresponds to an incoming interface, it means this next RRO node does not correspond to the outgoing interface, again the process returns to step 120 and the downstream ESVP node continues to traverse to another next RRO node. Otherwise, if this next RRO node does not correspond to an incoming interface, the downstream RSVP node may determine that this next RRO node corresponds to the outgoing interface based on the above conditions. In other words, this next RRO node corresponds to the second nearest outgoing interface from the downstream RSVP node. The process proceeds to step 170.

By steps 140-160, the downstream RSVP node may determine whether this next RRO node corresponds to the outgoing interface indirectly according to newly added interface classification identifications for identifying whether an RRO node corresponds to an incoming interface. This method takes advantages of the fact that incoming interface classification identification is seldom used at present, so that the probability that the newly added interface classification identifications conflict with other existing identifications defined by manufacturers may be reduced, the case that part of manufacturers can not identify the newly added identifications, which results in a failure in the establishment of an LSP, may be avoided. In this way, the present invention may be compatible with the RSVP nodes defined by a larger number of manufacturers.

In step 170, the downstream RSVP node continues to judge whether a protection identification of an RRO node corresponding to a last outgoing interface of the nearest outgoing interface is set as a protection state. If the protection identification of the RRO node corresponding to the last outgoing interface of the nearest outgoing interface is set as a protection state, it means that there is a backup LSP link between the downstream RSVP and a last last RSVP node, and the last RSVP node of the downstream RSVP node is a protected node, the process proceeds to step 180. Otherwise, if the protection identification of the RRO node corresponding to the last outgoing interface of the nearest outgoing interface is not set as a protection state, the downstream RSVP node determines that there is not a backup LSP link associated with the downstream RSVP node, and the process is terminated.

In step 180, a corresponding LSP state block is set in a protected state, to provide NNHOP protection for the above mentioned protected last RSVP node of the downstream RSVP node and LSP links at both ends of the protected last RSVP node, so that the backup LSP pre-established may be utilized correctly when a failure occurs on the protected last RSVP node, so as to ensure the normal data transmission.

In step 190, the downstream RSVP node sets a corresponding LSP state block in a protected state to configure NHOP protection for the LSP between the downstream RSVP node and the last upstream RSVP. The process is ended.

The method for LSP protection according to the second embodiment of the invention is similar to that of the first embodiment. The difference lies in that, in the first embodiment, an interface classification identification indicating whether an RRO node corresponds to an incoming interface is preset in the RRO node, so that an RSVP node may judge indirectly whether the RRO node corresponds to an outgoing interface through a plurality of steps according the interface classification identification; while in the second embodiment, an interface classification identification indicating whether an RRO node corresponds to an outgoing interface is preset in the RRO node, so that an RSVP node may judge directly whether the RRO node corresponds to the outgoing interface according the interface classification identification indicating whether the RRO node corresponds to the outgoing interface. Compared with the first embodiment, the method for judging an outgoing interface in the second embodiment is relatively convenient in implementation.

Figure 2:
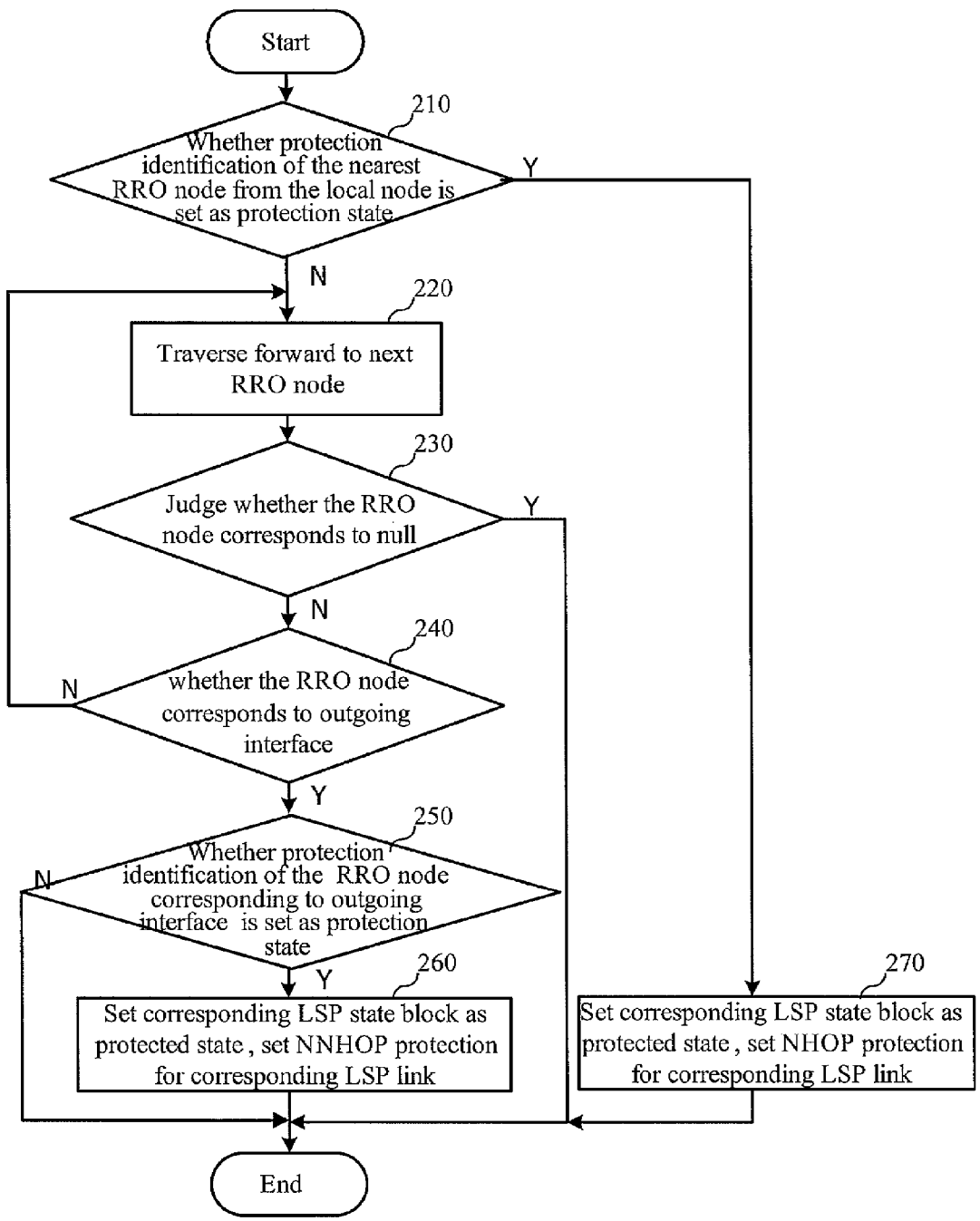
FIG. 2 is a flow chart showing a method for protecting an LSP according to a second embodiment of the invention.

As shown particularly in FIG. 2, steps 210-230 are similar to steps 110-130. The only difference is that, in step 210, the process proceeds to step 270 if the protection identification of the nearest RRO node from the downstream RSVP node is set as a protection state.

In step 240 following the step 230, the downstream RSVP node directly judges whether this next RRO node corresponds to an outgoing interface according to the interface classification identification indicating whether this next RRO node corresponds to the outgoing interface. If this next RRO node corresponds to the outgoing interface, it means that this next RRO node is the second nearest outgoing interface from the downstream RSVP node, the process proceeds to step 250. Otherwise, the process returns to step 220, the downstream RSVP node continues to traverse to another next RRO node.

Steps 250-270 are similar to steps 170-190 in the first embodiment, and are not repeated.

According to an embodiment of the invention, a device for LSP protection includes a first configuration module, a look-up module and a second configuration module. The first configuration module is adapted for setting interface classification identifications of RRO nodes corresponding to interfaces of a local RSVP node, the RRO nodes is contained in an RRO node list to be delivered downstream from the local RSVP node. The look-up module is adapted for finding a second nearest upstream RRO node corresponding to an outgoing interface from an RRO node list received from upstream according to interface classification identifications contained in the RRP node list when receiving the RRO node list. The second configuration module is adapted for setting NNHOP protection for a corresponding LSP according to a protection identification of the second nearest upstream RRO node corresponding to the outgoing interface found by the look-up module.

In particular, an upstream RSVP node sets interface classification identifications of RRO nodes corresponding to interfaces of the upstream RSVP node by using a first configuration module in the upstream RSVP node, the RRO nodes is contained in an RRO node list to be delivered downstream from the upstream RSVP node. When receiving the RRO node list, a downstream RSVP node finds a nearest upstream RRO node corresponding to an outgoing interface from the RRO node list according to the interface classification identifications by using a look-up module in the downstream RSVP module. If a protection identification of the nearest upstream RRO node corresponding to the outgoing interface is set as a protection state, the downstream RSVP node notifies a second configuration module to set a corresponding LSP state block as a protected state, and set NHOP protection for a corresponding LSP. If the protection identification of the nearest upstream RRO node corresponding to the outgoing interface is not set as a protection state, the downstream RSVP node continues to find a second nearest upstream RRO node corresponding to the outgoing interface from the RRO node list by using the look-up module. If a protection identification of the second nearest upstream RRO node corresponding to the outgoing interface is set as a protection state, the downstream RSVP node notifies the second configuration module to set a corresponding LSP state block as a protected state, and set NNHOP protection for a corresponding LSP By traversing the RRO nodes in the RRO node list, the downstream RSVP node finds the second nearest upstream RRO node corresponding to the outgoing interface, and judges precisely whether an upstream LSP of the downstream RSVP node needs NNHOP protection according to the state of the protection identification of the second nearest upstream RRO node corresponding to the outgoing interface, so as to precisely set a corresponding LSP state block as a protected state. In this way, a pre-established LSP may be utilized correctly when a failure occurs on a protected node or LSP link.

A person of ordinary skill in the art shall appreciate that all or part of the steps or modules in the above described embodiments may be implemented through instructing associated hardware by programs. The programs may be stored in computer readable media, such as ROM/RAM, magnetic disc optical disk, etc. Alternatively, all or part of the steps or modules in the above described embodiments may be made in form of integrated circuit modules respectively, or a number of steps or modules among them may be integrated in a single circuit module. The invention should not be limited to any particular hardware or software or combination of hardware and software.

As can be seen from the above embodiments of the invention, before judging whether the protection identification of the second nearest upstream RRO node corresponding to the outgoing interface is set as a protection state, it is judged first whether the protection identification of the nearest upstream RRO node is set as a protection state. In other words, it is judged first whether the nearest upstream outgoing interface is protected, so as to detect the NHOP.

There are two methods for an RSVP node to find the second nearest upstream RRO node corresponding to an outgoing interface. One method is to set in an RRO node an interface classification identification for identifying whether the RRO node corresponds to an outgoing interface. In this way, the RSVP node may judge whether the RRO node corresponds to the outgoing interface according to the interface classification identification directly, and traverse forward to find the second nearest upstream RRO node corresponding to an outgoing interface.

Another method is to set in an RRO node an interface classification identification for identifying whether the RRO node corresponds to an incoming interface. In this way, the RSVP node may find an outgoing interface by an exclusive method. In other words, if an RRO node is not IPV6, nor is the RRO node an RSVP node identification, nor does the RRO node correspond to an incoming interface, then the RRO node corresponds to the outgoing interface.

The former method may judge whether an RRO node corresponds to an outgoing interface directly according to an interface classification identification, is therefore easy in implementation. The latter method may judge whether an RRO node corresponds to an outgoing interface indirectly according to an interface classification identification, so as to reduce the probability of failure in LSP establishment in the case that some manufacturers can not identify the newly added identification. With the method of the invention, an LSP will not be deleted immediately when a failure occurs on an interface or node, the NNHOP protection for an upstream LSP may be detected.

Though the invention has been illustrated and described with reference to some preferred embodiments of the invention, a person of ordinary skill in the art will appreciate that various modifications may be made in forms and details without departing from the spirit and scope of the invention.

What is claimed is:

1. A method for protecting a label switched path, comprising:

Receiving, by a downstream Resource ReSerVation Protocol, RSVP, node, a record_route object node list from an upstream RSVP node, wherein the record_route object node list records interface classification identifications in record_route object corresponding to interfaces of resource reservation protocol nodes, and the interface classification identifications are configured to indicate whether record_route object nodes correspond to incoming interfaces;

Judging, by the downstream RSVP node, whether a protection identification of a nearest upstream outgoing interface upstream in the record_route object node list is set as a protection state;

If the protection identification isn't set as a protection state, setting, by the downstream RSVP node, next hop protection for a corresponding label switched path; and If the protection identification isn't set as a protection state, traversing by the downstream RSVP node, to a last record_route object node of a record_route object node corresponding to the nearest upstream outgoing interface, and judging, by the downstream RSVP node, whether the last record_route object node is null;

If the last record route object node is null, the process of the method for protecting a label switched path is terminated; if the last record_route object node isn't null, when the last record_route object node correspond to an Internet Protocol version 4, IPV4, address and does not correspond to a resource reservation protocol node identification and incoming interface, determining the last record_route object node is the record_route object node corresponding to the last outgoing interface of the nearest upstream outgoing interface; if the last record_route object node does not correspond to an IPV4 address or a resource reservation protocol node identification or an incoming interface, finding another last upstream record_route object node in upstream direction from the last record_route object node, and performing judgment for another last upstream record_route object node; and setting, by the downstream RSVP node, next next hop protection for the corresponding label switched path according to the protection identification of the record_route object node corresponding to the last outgoing interface of the nearest upstream outgoing interface.

2. The method according to claim 1, wherein setting, by the downstream RSVP node, the next next hop protection for the corresponding label switched path according to the protection identification of the record-route object node corresponding to the last outgoing interface of the nearest upstream outgoing interface comprises: when the protection identification of the record-route object node corresponding to the last outgoing interface of the nearest upstream outgoing interface is set as a protection state, setting the corresponding label switched path as a protected state, to achieve the next next hop protection.

3. A resource reservation protocol node device, comprising: an interface information configuration module, adapted for setting interface classification identifications of record_route object nodes corresponding to interfaces of a local resource reservation protocol node in a record_route object node list to be delivered downstream; a look-up module, adapted for finding, when receiving a record_route object node list from upstream, a record_route object node corresponding to a last outgoing interface of a nearest outgoing interface in the record_route object node list according to interface classification identifications; a first protection implementation module, adapted for setting next next hop protection for a corresponding label switched path according to a protection identification of the record_route object node corresponding to the last outgoing interface of the nearest outgoing interface found by the look-up module; and a second protection implementation module, adapted for setting, when the protection identification of the record route object node corresponding to the last outgoing interface of the nearest outgoing interface in the record route object list is identified to be set as a protected state, next hop protection for a corresponding label switched path, and notifying the look-up module to give up searching for the record route_object node corresponding to the last outgoing interface of the nearest outgoing interface;

a module, adapted for traversing to a last record_route object node of a record_route object node corresponding to the nearest upstream outgoing interface if the protection identification isn't set as a protection state, and judging whether the last record_route object node is null; if the last record object is null, the process of the method for protecting a label switched path is terminated; if the last record_route object node isn't null when the last record_route object node corresponds to an Internet Protocol version 4, IPV4, address and does not correspond to a resource reservation protocol node identification and incoming interface, determining the last record_route object node is the record_route object node corresponding to the last outgoing interface of the nearest upstream outgoing interface; if the last record_route object node does not correspond to an IPV4 address or a resource reservation protocol node identification or an incoming interface, finding another last upstream record_route object node in upstream direction from the last record_route object node, and performing judgment for another last upstream record_route object node; and setting next next hop protection for the corresponding label switched path according to the protection identification of the record_route object node corresponding to the last outgoing interface of the nearest upstream outgoing interface.

4. The resource reservation protocol node device according to claim 3, wherein the look-up module comprises:

a searching module, adapted for searching in the record_route object node list received from upstream, selecting a last record_route object node of a record_route object node corresponding to the nearest outgoing interface; and searching for, when a judgment result of a first judgment module is negative or a judgment result of a second judgment module is positive or a judgment result of a third judgment module is positive, another last record_route object node upstream from the last record_route object node, until a determination module identifies the record_route object node corresponding to the last outgoing interface of the nearest outgoing interface; the first judgment module, adapted for judging whether a record_route object node searched by the searching module corresponds to an Internet Protocol version 4, IPV4, address; the second judgment module, adapted for judging, when the first judgment module determines that record_route object node corresponds to an IPV4 address, whether the record_route object node corresponds to a resource reservation protocol node identification; the third judgment module, adapted for judging, when the second judgment module determines that record_route object node corresponds to a resource reservation protocol node identification, whether the record_route object node corresponds to an incoming interface; the determination module, adapted for determining, when the third judgment module determines that record_route object node corresponds to an incoming interface, whether the record_route object node corresponds to the last outgoing interface of the nearest outgoing interface.

5. The resource reservation protocol node device according to claim 4, wherein the first protection implementation module comprises: a first identification module, adapted for identifying the protection identification of the record_route object node corresponding to the last outgoing interface of the nearest outgoing interface; a first protection configuration module, adapted for setting, when the first identification module judges that the protection identification of the record_route object node corresponding to the last outgoing interface of the nearest outgoing interface is set as a protected state, the corresponding label switched path as a protected state, to achieve next next hop protection.

6. The resource reservation protocol node device according to claim 3, wherein the look-up module comprises a fourth judgment module and a searching module, wherein the searching module is adapted for searching in the record_route object node list received from upstream, selecting a last record_route object node of a record_route object node corresponding to the nearest outgoing interface; and searching for, when a judgment result of the fourth judgment module is negative, another last record_route object node upstream from the last record_route object node, until the fourth judgment module identifies the record_route object node corresponding to the last outgoing interface of the nearest outgoing interface; the fourth judgment module is adapted for judging whether a record_route object node searched by the searching node corresponds to an outgoing interface, and determining the record_route object node corresponds to the last outgoing interface of the nearest outgoing interface when the record_route object node searched by the searching node corresponds to an outgoing interface.

7. The resource reservation protocol node device according to claim 6, wherein the first protection implementation module comprises: a first identification module, adapted for identifying the protection identification of the record_route object node corresponding to the last outgoing interface of the nearest outgoing interface; a first protection configuration module, adapted for setting, when the first identification module judges that the protection identification of the record_route object node corresponding to the last outgoing interface of the nearest outgoing interface is set as a protected state, the corresponding label switched path as a protected state, to achieve next next hop protection.

8. The resource reservation protocol node device according to claim 3, wherein the first protection implementation module comprises: a first identification module, adapted for identifying the protection identification of the record_route object node corresponding to the last outgoing interface of the nearest outgoing interface; a first protection configuration module, adapted for setting, when the first identification module judges that the protection identification of the record route object node corresponding to the last outgoing interface of the nearest outgoing interface is set as a protected state, the corresponding label switched path as a protected state, to achieve next next hop protection.

9. The resource reservation protocol node device according to claim 3, wherein the second protection implementation module comprises: a second identification module, adapted for identifying the protection identification of the record_route object node corresponding to the last outgoing interface of the nearest outgoing interface; a second protection configuration module, adapted for setting, when the second identification module identifies that the protection identification of the record_route object node corresponding to the last outgoing interface of the nearest outgoing interface is set as a protected state, the corresponding label switched path as a protected state, to achieve next next hop protection; a notification module, adapted for notifying, when the second identification module identifies that the protection identification of the record_route object node corresponding to the last outgoing interface of the nearest outgoing interface is set as a protected state, the look-up module to give up searching for the record_route object node corresponding to the last outgoing interface of the nearest outgoing interface.

10. A system for protecting a label switched path, comprising at least three resource reservation protocol nodes, wherein each resource reservation protocol node comprises: an interface information configuration module, adapted for setting interface classification identifications of record_route object nodes corresponding to interfaces of a local resource reservation protocol node in a record_route object node list to be delivered downstream; a look-up module, adapted for finding, when receiving a record_route object node list from upstream, a record_route object node corresponding to a last outgoing interface of a nearest outgoing interface in the record_route object node list according to interface classification identifications; a first protection implementation module, adapted for setting next next hop protection for a corresponding label switched path according to a protection identification of the record_route object node corresponding to the last outgoing interface of the nearest outgoing interface found by the look-up module and a second protection implementation module, adapted for setting, when the protection identification of the record route object node corresponding to the last outgoing interface of the nearest outgoing interface in the record route object list is identified to be set as a protected state, next hop protection for a corresponding label switched path, and notifying the look-up module to give up searching for the record route object node corresponding to the last outgoing interface of the nearest outgoing interface; and a module, adapted for traversing to a last record_route object node of a record_route object node corresponding to the nearest upstream outgoing interface if the protection identification isn't set as a protection state, and judging whether the last record_route object node is null; if the last record object is null, the process of the method for protecting a label switched path is terminated; if the last record_route object node isn't null when the last record_route object node corresponds to an Internet Protocol version 4, IPV4, address and does not correspond to a resource reservation protocol node identification and incoming interface, determining the last record_route object node is the record_route object node corresponding to the last outgoing interface of the nearest upstream outgoing interface; if the last record_route object node does not correspond to an IPV4 address or a resource reservation protocol node identification or an incoming interface, finding another last upstream record_route object node in upstream direction from the last record_route object node, and performing judgment for another last upstream record_route object node; and setting next next hop protection for the corresponding label switched path according to the protection identification of the record_route object node corresponding to the last outgoing interface of the nearest upstream outgoing interface.

11. A method for protecting a label switched path, comprising:

Receiving, by a downstream Resource ReSerVation Protocol, RSVP, node, a record_route object node list from an upstream RSVP node, wherein the record_route object node list records interface classification identifications in record_route object corresponding to interfaces of resource reservation protocol nodes, and the interface classification identifications are configured to indicate whether record_route object nodes correspond to incoming interfaces;

Judging, by the downstream RSVP node, whether a protection identification of a nearest upstream outgoing interface upstream in the record_route object node list is set as a protection state;

If the protection identification isn't set as a protection state, setting, by the downstream RSVP node, next hop protection for a corresponding label switched path; and If the protection identification isn't set as a protection state, traversing by the downstream RSVP node, to a last record route_object node of a record_route object node corresponding to the nearest upstream outgoing interface, and judging, by the downstream RSVP node, whether the last record_route object node is null;

If the last record route object node is null, the process of the method for protecting a label switched path is terminated; if the last record_route object node isn't null, judging whether the last record_route object node corresponds to an outgoing interface; if the last record_route object node corresponds to an outgoing interface, determining the last record_route object node is the record_route object node corresponding to the last outgoing interface of the nearest upstream outgoing interface; if the last record_route object node does not correspond to an outgoing interface, finding another last upstream record_route object node in upstream direction from the last record_route object node in upstream direction from the last record_route object node, and performing judgment for another last upstream record_route object node; and setting, by the downstream RSVP node, next next hop protection for the corresponding label switched path according to the protection identification of the record_route object node corresponding to the last outgoing interface of the nearest upstream outgoing interface.

* * * * *